(12) United States Patent
Washiro

(10) Patent No.: US 8,339,213 B2
(45) Date of Patent: Dec. 25, 2012

(54) COMMUNICATION DEVICE AND HIGH-FREQUENCY COUPLER

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 12/728,100

(22) Filed: Mar. 19, 2010

(65) Prior Publication Data

US 2010/0244991 A1 Sep. 30, 2010

(30) Foreign Application Priority Data

Mar. 30, 2009 (JP) ................ P2009-080793

(51) Int. Cl.
*H01P 5/00* (2006.01)
*H01Q 9/04* (2006.01)

(52) U.S. Cl. ................ 333/24 R; 343/700 MS

(58) Field of Classification Search ............... 333/24 R, 333/219; 375/130; 343/850, 700 MS
See application file for complete search history.

(56) References Cited

U.S. PATENT DOCUMENTS

| | | | |
|---|---|---|---|
| 6,900,773 B2 * | 5/2005 | Poilasne et al. | 343/795 |
| 7,696,932 B2 * | 4/2010 | Desclos et al. | 343/702 |
| 7,760,150 B2 * | 7/2010 | Sato | 343/724 |
| 2001/0033250 A1 | 10/2001 | Kelien et al. | |
| 2002/0118075 A1 | 8/2002 | Ohwada et al. | |
| 2004/0077313 A1 | 4/2004 | Oba et al. | |
| 2008/0119135 A1 | 5/2008 | Washiro | |
| 2008/0311849 A1 * | 12/2008 | Washiro | 455/41.1 |
| 2010/0244991 A1 * | 9/2010 | Washiro | 333/219 |
| 2010/0248625 A1 * | 9/2010 | Washiro | 455/41.1 |
| 2010/0327997 A1 * | 12/2010 | Washiro | 333/24 R |
| 2011/0222585 A1 * | 9/2011 | Washiro | 375/130 |
| 2011/0222586 A1 * | 9/2011 | Washiro | 375/130 |
| 2011/0228814 A1 * | 9/2011 | Washiro | 375/130 |
| 2011/0230136 A1 * | 9/2011 | Washiro | 455/41.1 |

FOREIGN PATENT DOCUMENTS

| | | |
|---|---|---|
| EP | 1 926 223 A2 | 5/2008 |
| JP | 2003-087263 | 3/2003 |
| JP | 2008-099236 | 4/2008 |
| JP | 2008-312074 | 12/2008 |

OTHER PUBLICATIONS

Washiro, Communication Device, Dec. 25, 2008, Sony Corp. translation of 2008-312074.*
European Search Report from The Hague for European Application No. 10 15 6782 (Completion date: Jun. 23, 2010).

* cited by examiner

*Primary Examiner* — Dean O Takaoka
(74) *Attorney, Agent, or Firm* — Finnegan Henderson Farabow Garrett & Dunner LLP

(57) ABSTRACT

A communication device includes a communication circuit unit, a transmission path, a ground, a coupling electrode, and a resonating unit. The resonating unit includes a first resonating unit connected to the transmission path and a second resonating unit having one end connected to the first resonating unit and another end short-circuited to the ground, the second resonating unit having terminals of the coupling electrode connected thereto. A microdipole is formed of a line segment connecting a center of charges stored in the coupling electrode and a center of mirror-image charges stored in the ground. The high-frequency signal is transmitted to a distant side disposed so as to face the communication device with an angle θ formed relative to a direction of the microdipole being approximately 0 degree.

8 Claims, 13 Drawing Sheets

POINT A

COMMUNICATION DEVICE AND HIGH-FREQUENCY COUPLER

BACKGROUND OF THE INVENTION

1. Field of the Invention

The present invention relates to communication devices and high-frequency couplers for large-capacity data transmission in close proximity through a weak UWB communication technique using a high-frequency wide band and, in particular, to a communication device and high-frequency coupler of low height.

2. Description of the Related Art

Non-contact communication has been widely available as a medium for authentication information, electronic money, and other value information. Examples of an IC card standard complying with ISO/IEC 14443 include Type A, Type B, and FeliCa®. Furthermore, near field communication (NFC) developed by Sony Corporation and Koninklijke Philips Electronics N.V. is an RFID standard mainly defining specifications of an NFC communication device (reader/writer) communicable with an IC card of each of Type A, Type B, and FeliCa. In NFC, with the use of a band of 13.56 MHz, non-contact bidirectional communication of a close-proximity type (0 or more but 10 or less cm) can be performed through electromagnetic induction.

In recent years, a reader/writer module of a compact size suitable for incorporation has been developed and manufactured, and can be used as being implemented for use in various devices, such as a point of sales (POS) terminal, vending machine, and personal computer. For example, an information processing device of a notebook type is suggested in which a reader/writer module is incorporated in a palm rest portion of a keyboard of a main body and information is read from a non-contact IC tag nearby (for example, refer to Japanese Unexamined Patent Application Publication No. 2003-87263).

An example of a further application of a non-contact communication system is large-capacity data transmission, such as downloading or streaming of moving pictures and music. For example, it can be assumed that non-contact communication is used when a fee-based content is downloaded from a vending machine to a portable terminal or when a content is downloaded from a fee-based site to a portable terminal via a personal computer connected to the Internet. In this case, it is preferable that a single user operation of holding the portable terminal over a read surface suffices and the operation completes with the sense of the same access time as that for authentication and billing in the past. Therefore, a high communication rate is desired.

However, the communication rate in NFC communication, which is a typical example of non-contact communication, is approximately 106 kbps to 424 kbps, which is sufficient for personal authentication or billing process but is extremely slow compared with other general-purpose wireless communication (such as WiFi and Bluetooth). Also, in the technique in the past, such as NFC communication, an achievable maximum communication rate is up to 848 kbps at best, due to physical constraints, such as carrier frequency. Thus, it is difficult to expect a dramatic increase in rate in the future.

By contrast, an example of a close-proximity wireless transfer technology applicable to high-speed communication is TransferJet using a weak ultra wide band (UWB) signal (for example, refer to Japanese Unexamined Patent Application Publication No. 2008-99236 and www.transferjet.org/en/index.html (as of Mar. 23, 2009)).

The above-mentioned close-proximity wireless transfer technology (TransferJet) is of a technique of basically transmitting a signal by using an electric-field coupling action, and a communication device for the technique includes a communication circuit unit processing a high-frequency signal, a coupling electrode disposed so as to be separated from a ground at a predetermined height, and an resonating unit efficiently supplying the high-frequency signal to the coupling electrode. As with the non-contact IC tag described above, when the communication device is implemented on an information device for use, it can be one of important technical problems to lower the height of the weak UWB communication device.

SUMMARY OF THE INVENTION

It is desirable to provide an excellent communication device and high-frequency coupler of low height capable of suitably performing large-capacity data transmission in close proximity through a weak UWB communication technique using a high-frequency wide band.

According to an embodiment of the present invention, a communication device includes a communication circuit unit processing a high-frequency signal transmitting data, a transmission path for the high-frequency signal, the transmission path being connected to the communication circuit unit, a ground, a coupling electrode supported by two terminals so as to face the ground and to be separated by a height negligible with respect to a wavelength of the high-frequency signal, and a resonating unit increasing a current flowing into the coupling electrode via the transmission path. The resonating unit includes a first resonating unit connected to the transmission path and a second resonating unit having one end connected to the first resonating unit and another end short-circuited to the ground, the second resonating unit having the terminals of the coupling electrode connected thereto. A microdipole is formed of a line segment connecting a center of charges stored in the coupling electrode and a center of mirror-image charges stored in the ground, and the high-frequency signal is transmitted to a distant side disposed so as to face the communication device with an angle θ formed relative to a direction of the microdipole being approximately 0 degree.

Specifically, the high-frequency signal in another embodiment of the present invention is a UWB signal using an ultra wide band.

Also, according to another embodiment of the present invention, the ground of the communication device according to the embodiment described earlier is a conductor pattern formed on one surface of a dielectric board, and the first resonating unit and the second resonating unit are stubs each formed of a conductor pattern formed on another surface of the dielectric board.

Furthermore, according to another embodiment of the present invention, the second resonating unit of the communication device according to the embodiment described earlier is divided at a cut-out portion at a predetermined position, and is formed of a first stub having one end connected to the first resonating unit and a second stub having a tip short-circuited to the ground. Also, one of the terminals of the coupling electrode is connected to the first stub and another of the terminals is connected to the second stub.

According to another embodiment of the present invention, the first stub and the second stub of the communication device according to the embodiment described earlier have an approximately same phase length. More specifically, according to embodiments of the present invention, the second resonating unit including the first stub, the coupling electrode, and the second stub has, as a whole, a phase length of an approximately ½ wavelength. Also, the first and second stubs both have a phase length of an approximately ⅛ wavelength, and the coupling electrode connected to the first and second stubs with the two terminals has a phase length of an approximately ¼ wavelength.

According to another embodiment of the present invention, the first resonating unit of the communication device according to the embodiment described earlier is a stub having a phase length of an approximately ½ wavelength, and is short-circuited to the ground at another end not connected to the transmission path. Also, the second resonating unit has one end connected to an approximately center position of the first resonating unit.

According to another embodiment of the present invention, a high-frequency coupler includes a transmission path for a high-frequency signal, a ground, a coupling electrode supported by two terminals so as to face the ground and to be separated by a height negligible with respect to a wavelength of the high-frequency signal, and a resonating unit increasing a current flowing into the coupling electrode via the transmission path. The resonating unit includes a first resonating unit connected to the transmission path and a second resonating unit having one end connected to the first resonating unit and another end short-circuited to the ground, the second resonating unit having the terminals of the coupling electrode connected thereto. A microdipole is formed of a line segment connecting a center of charges stored in the coupling electrode and a center of mirror-image charges stored in the ground, and the high-frequency signal is transmitted to a high-frequency coupler, of a distant side, disposed so as to face the high-frequency coupler with an angle θ formed relative to a direction of the microdipole being approximately 0 degree.

According to the embodiments of the present invention, an excellent communication device and high-frequency coupler of low height can be provided capable of suitably performing large-capacity data transmission in close proximity through a weak UWB communication technique using a high-frequency wide band.

According to the embodiments of the present invention, an inexpensive high-frequency coupler having a sufficient mechanical strength can be obtained, and its electric characteristics are hard to deteriorate even when the height is lowered. That is, according to the embodiments of the present invention, a high-frequency coupler capable of satisfying all demands for mass-productivity, small size, low-height, and excellent electric characteristics can be obtained.

According to the embodiments of the present invention, the coupling electrode is supported by two terminals. Therefore, the high-frequency coupler can keep a sufficient mechanical strength. Also, a standing wave is generated by the first resonating unit formed of a stub (or a lumped constant circuit) to allow a stronger high-frequency signal to be fed to the second resonating unit. Therefore, deterioration in electric characteristics due to low height can be suppressed.

According to the embodiment of the present invention, the resonant stub is cut out, and two terminals, front and rear, supporting the coupling electrode are connected to the resonant stub so as to overstride the cut-out portion. Therefore, a current not flowing through the coupling electrode and passing over the resonant stub can be suppressed, and deterioration in electric characteristics due to low height can be suppressed.

According to the embodiment of the present invention, since the first stub and the second stub have an approximately same phase length, the voltage amplitude is maximized at the position of the coupling electrode. Therefore, the high-frequency coupler can obtain a stronger coupling action, and deterioration in electric characteristics due to low height can be suppressed.

According to the embodiments of the present invention, the first and second stubs both have a phase length of an approximately ⅛ wavelength, and the coupling electrode has a phase length of an approximately ¼ wavelength. Therefore, the high-frequency coupler can obtain a stronger coupling action, and deterioration in electric characteristics due to low height can be suppressed.

According to the embodiment of the present invention, the voltage amplitude of the standing wave is maximum near the center of the stub forming the first resonating unit. With the second resonating unit connected to that position, the high-frequency signal can be efficiently fed to the second resonating unit. Thus, the high-frequency coupler can obtain a stronger coupling action, and deterioration in electric characteristics due to low height can be suppressed.

Further features and advantages of the present invention will become apparent by more detailed description based on embodiments of the present invention described below and the attached drawings.

DESCRIPTION OF THE PREFERRED EMBODIMENTS

Embodiments of the present invention are described below with reference to the drawings.

First, the operation principle of near-proximity high-speed wireless communication using a weak UWB communication technique is described.

Figure 1:
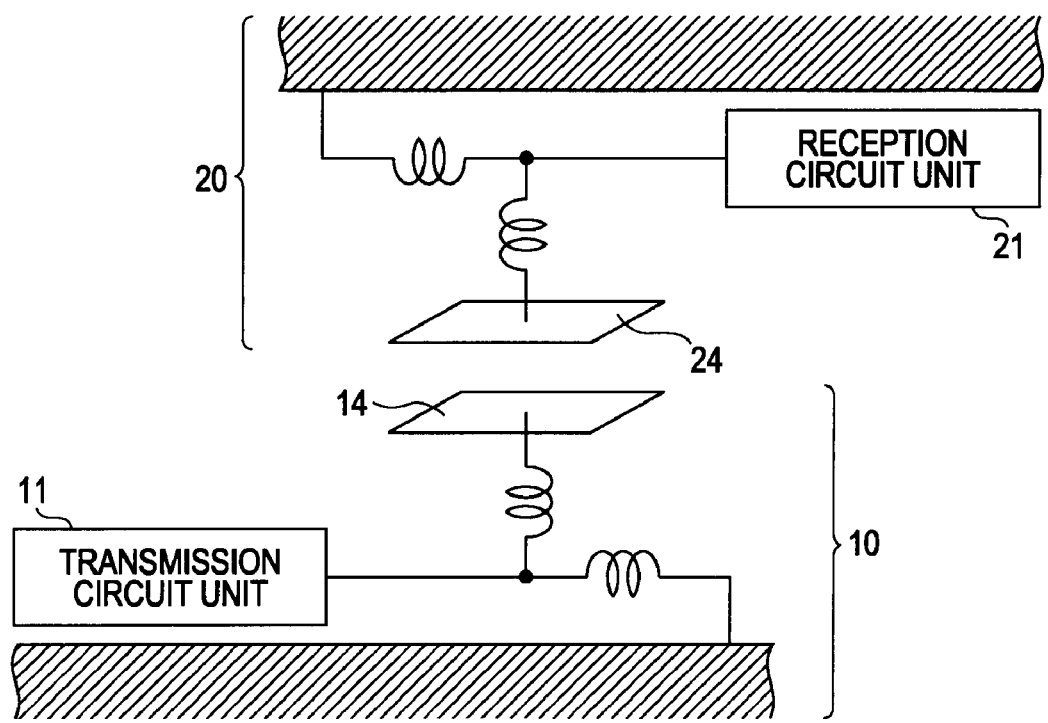
FIG. 1 schematically illustrates the structure of a near-proximity high-speed wireless communication system of a weak UWB communication technique.

FIG. 1 schematically illustrates the structure of a near-proximity high-speed wireless communication system of a weak UWB communication technique using an electric-field coupling action. In FIG. 1, a transmitter 10 and a receiver 20 have a coupling electrode 14 and a coupling electrode 24, respectively, for use in transmission and reception. These coupling electrodes 14 and 24 are disposed so as to face each other and be separated from each other by, for example, 3 cm, thereby allowing electric-field coupling. Upon a transmission request from a higher-level application, a transmission circuit unit 11 on a transmitter 10 generates a high-frequency transmission signal, such as a UWB signal, based on transmission data, and propagates the generated signal from the transmission coupling electrode 14 to the reception coupling electrode 24 as an electric-field signal. Then, a reception circuit unit 21 on a receiver 20 demodulates and decodes the received high-frequency electric-field signal, and passes reproduced data to the higher-level application.

According to the communication technique using a high-frequency wide band, such as UWB communication, ultra high-speed data transmission of approximately 100 Mbps can be performed in close proximity. Also, as described further below, when UWB communication is performed with the coupling action of an electrostatic field or induction field instead of a radiation field, the electric field strength is inversely proportional to the cube or square of the distance. Therefore, by suppressing the electric field strength at a distance of three meters from a wireless facility to be equal to or lower than a predetermined level, weak wireless without a license for a wireless station can be achieved, thereby configuring a communication system at low cost. Also, data communication is performed in close proximity with an electric-field coupling technique. Therefore, as one advantage, since a reflected wave from a reflector that is present nearby is small, the influence of interference is small. Furthermore, as another advantage, prevention of hacking or securing of confidentiality on the transmission path does not have to be taken into consideration.

On the other hand, as the propagation distance with respect to the wavelength increases, propagation loss increases. Therefore, to propagate a high-frequency signal through electric-field coupling, propagation loss is desired to be suppressed sufficiently low. In a communication technique of transmitting a high-frequency wide-band signal, such as a UWB signal, through electric-field coupling, even in close-proximity communication of approximately 3 cm, the distance is equivalent to an approximately ½ wavelength for a use frequency band of 4 GHz, and therefore the distance is not negligible. Among others, in a high-frequency circuit, the problem of characteristic impedance is serious compared with a low-frequency circuit, and an effect caused by an unmatching impedance becomes prominent at the coupling point between the electrodes of the transmitter and receiver.

In communication using a frequency of a kHz or MHz band, propagation loss in space is small. Therefore, the transmitter and the receiver each include a coupler formed of only an electrode. Even when the coupling portion operates simply as a parallel flat-plate capacitor, desired data transmission can be performed. By contrast, in communication for transmitting a signal by using high frequencies of a GHz band in a non-negligible distance with respect to the wavelength, propagation loss in space is large. Therefore, reflection of the transmission signal is desired to be suppressed to increase transmission efficiency. Even if a transmission path is adjusted to have a predetermined characteristic impedance at each of the transmitter and the receiver, impedance matching is difficult at the coupling portion as the parallel flat-plate capacitor. For example, in the communication system depicted in FIG. 1, even when a transmission path of a high-frequency electric-field signal coupling the transmission circuit unit 11 and the transmission coupling electrode 14 is a coaxial line with impedance matching of, for example, 50Ω, if the impedance at the coupling portion between the transmission coupling electrode 14 and the reception coupling electrode 24 is not matched, the electric-field signal is reflected to cause propagation loss, thereby decreasing communication efficiency.

Figure 2:
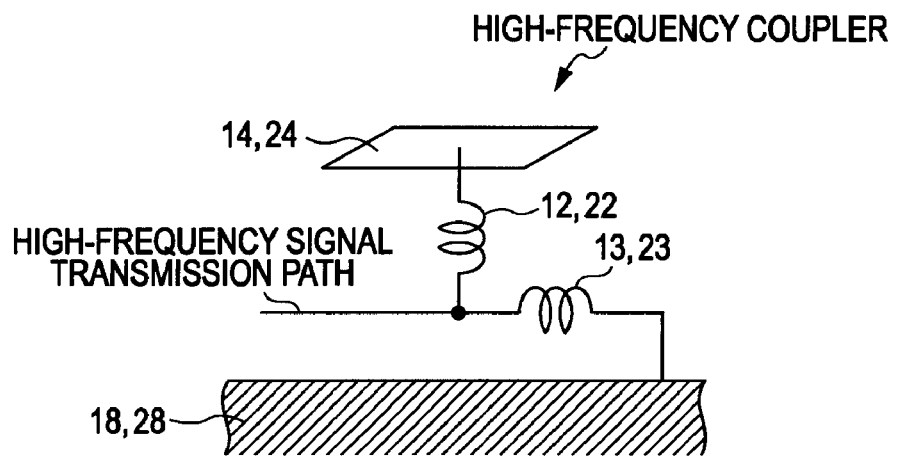
FIG. 2 illustrates the basic structure of a high-frequency coupler disposed in each of a transmitter and a receiver.

To get around this, as depicted in FIG. 2, the high-frequency coupler disposed in each of the transmitter 10 and the receiver 20 is configured so that a resonating unit including a flat-plate electrode 14, 24, a serial inductor 12, 22, and a parallel inductor 13, 23 is connected to a high-frequency signal transmission path. Here, the high-frequency signal transmission path can be configured of a coaxial cable, microstrip line, coplanar line, or the like. When such high-frequency couplers are disposed so as to face each other, the coupling portion operates as a band-pass filter in extremely close proximity where a quasi-electrostatic field is dominant, thereby allowing transmission of a high-frequency signal. Also, even in a distance in which an induction field is dominant and which is not negligible with respect to the wavelength, a high-frequency signal can be transmitted between two high-frequency couplers via an induction field generated from a microdipole formed of charges and mirror-image charges stored in the coupling electrode and ground.

Here, if it is merely desired that simple impedance matching be ensured and a reflected wave be suppressed between the electrodes of the transmitter 10 and the receiver 20, that is, at the coupling portion, successive impedances at the coupling portion can be designed even with a simple structure of each coupler where the flat electrode 14, 24 and a serial inductor are connected in series on the high-frequency signal transmission path. However, the characteristic impedance is not changed before and after the coupling portion, and therefore the magnitude of a current is not changed. By contrast, with the provision of a parallel inductor 13, 23, a larger charge is fed to the coupling electrode 14, thereby producing a strong electric-field coupling action between the coupling electrodes 14 and 24. Also, when a large electric field is induced near the surface of the coupling electrode 14, the generated electric field propagates from the surface of the coupling electrode 14 as an electric-field signal of a longitudinal wave vibrating in a traveling direction (a direction of the microdipole, which will be described further below). With this electric-field wave, even if the distance between the coupling electrodes 14 and 24 (phase distance) is relatively long, the electric-field signal can be propagated.

Therefore, in the close-proximity wireless communication system of a weak UWB communication technique, conditions as a high-frequency coupler are as follows.

(1) There is a coupling electrode for coupling in an electric field at a position so as to face the ground and to be separated by a height negligible with respect to the wavelength of the high-frequency signal.

(2) There is a resonating unit (parallel inductor or stub) for coupling in a stronger electric field.

(3) The serial and parallel inductors, and the constant of a capacitor formed of coupling electrodes or the length of the stub are set so that impedance matching is ensured in a frequency band for use in communication when the coupling electrodes are placed so as to face each other.

In the communication system depicted in FIG. 1, when the coupling electrodes 14 and 24 of the transmitter 10 and the receiver 20 face each other as being separated from each other by an appropriate distance, two high-frequency couplers operate as a band-pass filter that lets an electric-field signal of a desired high-frequency band pass through and, as a single high-frequency coupler, each also operates as an impedance converter circuit that amplifies the current, thereby letting a current of a large amplitude flow into the coupling electrode. On the other hand, when the high-frequency coupler is placed in free space singly, the input impedance of the high-frequency coupler does not match the characteristic impedance of the high-frequency signal transmission path. Thus, a signal entering the high-frequency signal transmission path is reflected in the high-frequency coupler and is not emitted to the outside, and therefore does not influence other communication systems nearby. That is, when no counterpart for communication is present, the transmitter 10 does not send radio waves wastefully as an antenna, but ensures impedance matching only when a counterpart for communication comes near, thereby transferring a high-frequency electric-field signal.

Figure 3:
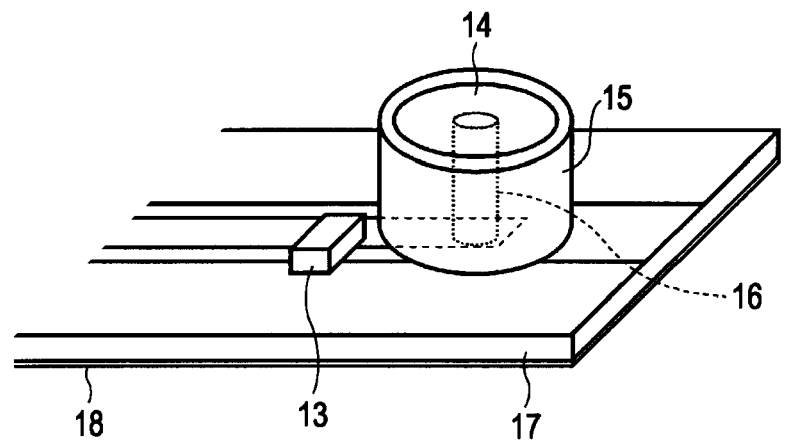
FIG. 3 illustrates an example of implementation of the high-frequency coupler depicted in FIG. 2.

FIG. 3 illustrates an example of implementation of the high-frequency coupler depicted in FIG. 2. The high-frequency coupler on either of the transmitter 10 and the receiver 20 can be configured similarly. In FIG. 3, the coupling electrode 14 is disposed on an upper surface of a spacer 15 formed of a dielectric shaped in a column, and is electrically connected to the high-frequency signal transmission path on the printed board 17 via a through hole 16 penetrating through the spacer 15.

For example, after the through hole 16 is formed in the column-shaped dielectric having a desired height, the through hole 16 is filled with a conductor, and a conductor pattern serving as the coupling electrode 14 is vapor-deposited on an upper end face of this column by, for example, plating technology. On the printed board 17, a wiring pattern serving as the high-frequency signal transmission path is formed. Then, with this spacer 15 implemented on the printed board 17 by reflow soldering or the like, a high-frequency coupler can be fabricated. By appropriately adjusting the height from the circuit implementation surface of the printed board 17 to the coupling electrode 14, that is, the length of the through hole 16 (phase length) according to the use wavelength, the through hole 16 takes on an inductance, and can be used in place of the serial inductor 12 depicted in FIG. 2. Also, the high-frequency signal transmission path is connected to a ground 18 via a chip-shaped parallel inductor 13.

Here, an electromagnetic field occurring in the coupling electrode 14 on the transmitter 10 is studied below.

As depicted in FIGS. 1 and 2, the coupling electrode 14 is connected to one end of the high-frequency signal transmission path, and a high-frequency signal output from the transmission circuit unit 11 flows into the coupling electrode 14, where charges are stored. Here, with the resonant action of a resonating unit formed of the serial inductor 12 and the parallel inductor 13, the current flowing into the coupling electrode 14 via the transmission path is amplified, and larger charges are stored.

Also, the ground 18 is disposed so as to face the coupling electrode 14 and to be separated by a height (phase length) negligible with respect to the wavelength of the high-frequency signal. When charges are stored in the coupling electrode 14 as described above, mirror-image charges are stored in the ground 18. When a point charge Q is placed outside of a flat conductor, a mirror-image charge Q (that is virtual with a replaced surface charge distribution) is disposed in the flat conductor, which is disclosed in, for example, Tadashi Mizoguchi, "Electromagnetism", (Shokabo Publishing Co., Ltd., pp. 54-57).

As a result, a microdipole is formed of a line segment connecting the center of the charges stored in the coupling electrode 14 and the center of the mirror-image charges stored in the ground 18. Precisely, the charge Q and the mirror-image charge $-Q$ each have a volume, and the microdipole is formed so as to connect the center of the charge and the center of the mirror-image charge. The microdipole herein represents an electric dipole with a extremely short distance between charges, and is described also in, for example, Yasuto Mushiake, "Antenna and radio-wave propagation", (Corona Publishing Co., Ltd., pp. 16-18). With this microdipole, a transverse-wave component $E_\theta$ of the electric field, a longitudinal-wave component $E_R$ of the electric field, and a magnetic field $H_\phi$ around the microdipole occur.

Figure 4:
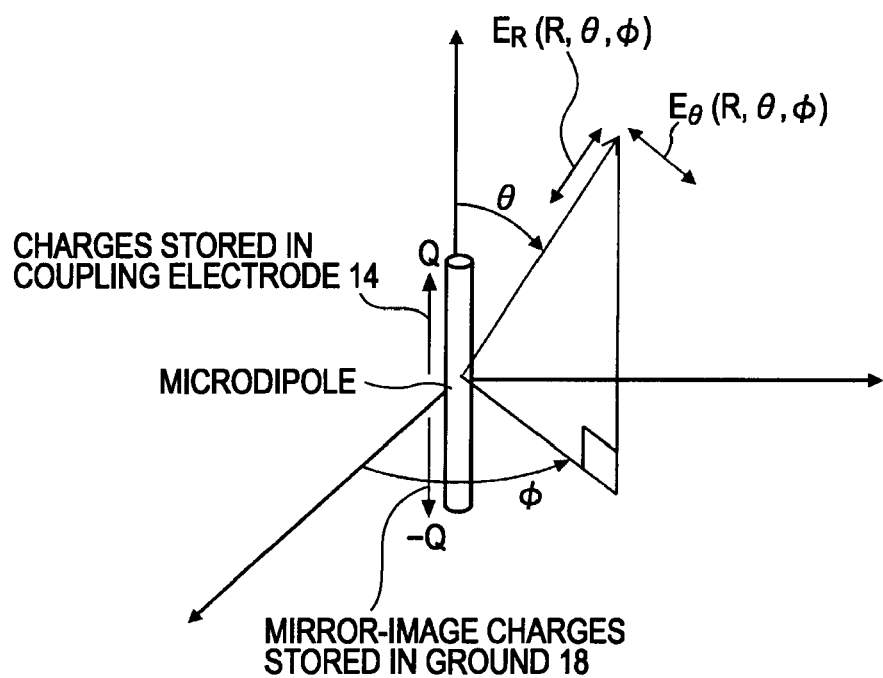
FIG. 4 illustrates an electromagnetic field caused by a microdipole.
Figure 5:
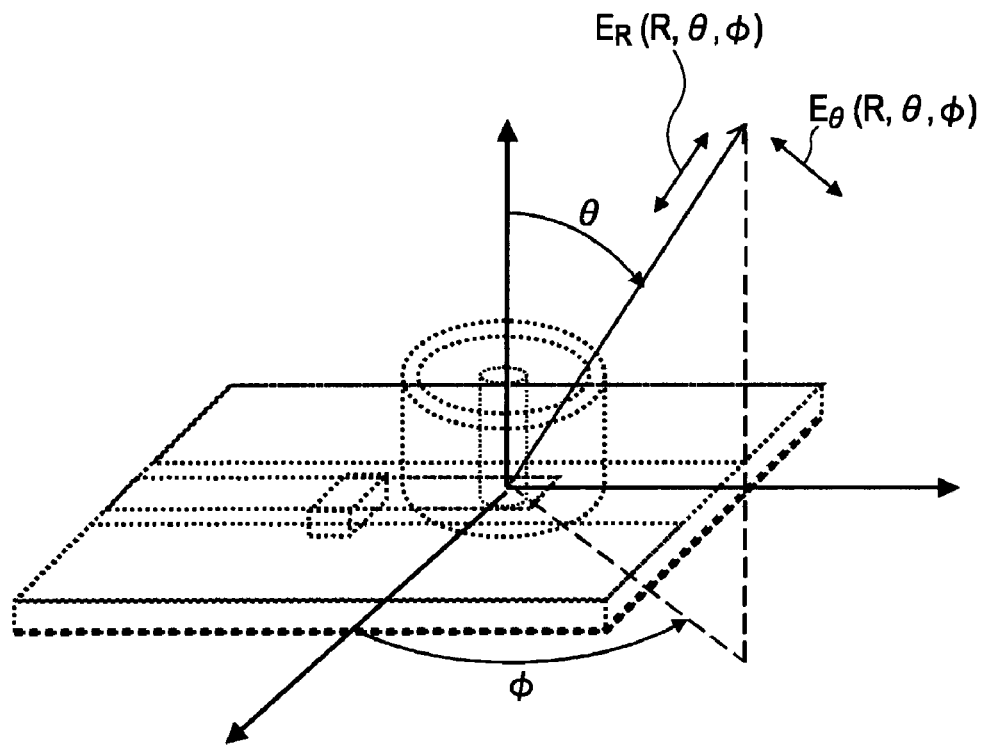
FIG. 5 illustrates the electromagnetic field depicted in FIG. 4 mapped on a coupling electrode.

FIG. 4 illustrates an electromagnetic field caused by a microdipole. FIG. 5 illustrates this electromagnetic field depicted mapped on the coupling electrode. As depicted in FIGS. 4 and 5, the transverse-wave component $E_\theta$ of the electric field vibrates in a direction perpendicular to a propagating direction, and the longitudinal-wave component $E_R$ of the electric field vibrates in an orientation parallel to the propagating direction. Around the microdipole, the magnetic field $H_\phi$ occurs. Equations (1) to (3) below represent an electromagnetic field generated by the microdipole, where a component inversely proportional to the cube of a distance R is an electrostatic field, a component inversely proportional to the square of the distance R is an induction field, and a component inversely proportional to the distance R is a radiation field.

$$E_\theta = \frac{pe^{-jkR}}{4\pi\varepsilon}\left(\frac{1}{R^3} + \frac{jk}{R^2} - \frac{k^2}{R}\right)\sin\theta \quad (1)$$

$$E_R = \frac{pe^{-jkR}}{2\pi\varepsilon}\left(\frac{1}{R^3} + \frac{jk}{R^2}\right)\cos\theta \quad (2)$$

$$H_\phi = \frac{j\omega pe^{-jkR}}{4\pi}\left(\frac{1}{R^2} + \frac{jk}{R}\right)\sin\theta \quad (3)$$

In the close-proximity wireless communication system depicted in FIG. 1, to suppress a disturbing wave to other peripheral systems, it is preferable to use the longitudinal-wave component $E_R$ not containing a component of the radiation field while suppressing the transverse-wave component $E_\theta$ containing a component of the radiation field. This is because, as can be seen from Equations (1) and (2) above, the transverse-wave component $E_\theta$ of the electric field contains a radiation field inversely proportional to the distance (that is, a radiation field with a small distance attenuation), but the longitudinal-wave component $E_R$ does not contain a radiation field.

Figure 6:
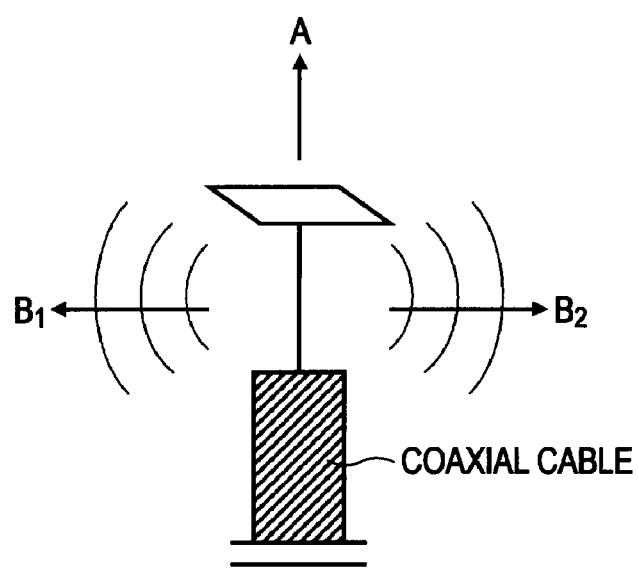
FIG. 6 illustrates an example of the structure of a capacitance-loaded antenna.

First, to prevent the occurrence of the transverse-wave component $E_\theta$ of the electric field, the high-frequency coupler is set so as not to operate as an antenna. The high-frequency coupler depicted in FIG. 2 appears to be similar in structure to a capacitance-loaded antenna having a metal at a tip of an antenna element for providing an electrostatic capacity to shorten the height of the antenna. Thus, the high-frequency coupler is set so as not to operate as a capacitance-loaded antenna. FIG. 6 illustrates an example of the structure of a capacitance-loaded antenna. In FIG. 6, the longitudinal-wave component $E_R$ of the electric field occurs mainly in a direction indicated by an arrow A, and the transverse-wave component $E_\theta$ of the electric field occurs in directions indicated by arrows $B_1$ and $B_2$.

In the example of the structure of the coupling electrode depicted in FIG. 3, the dielectric 15 and the through hole 16 play a role of avoiding coupling between the coupling electrode 14 and the ground 18 and also a role of forming the serial inductor 12. With the serial inductor 12 forming with a sufficient height from the circuit implementation surface of the printed board 17 to the coupling electrode 14, electric-field coupling between the ground 18 and the coupling electrode 14 is avoided, thereby ensuring an electric-field coupling action with the high-frequency coupler on the receiver. However, when the height of the dielectric 15 is long, that is, when the distance from the circuit implementation surface of the printed board 17 to the coupling electrode 14 is not negligible with respect to the use wavelength, the high-frequency coupler acts as a capacitance-loaded antenna, causing the transverse-wave component $E_\theta$ in the directions as indicated by the arrows $B_1$ and $B_2$ in FIG. 6. Therefore, the height of the dielectric 15 is set to have a sufficient length so as to avoid the coupling between the coupling electrode 14 and the ground 18 to obtain characteristics as a high-frequency coupler and to form the serial inductor 12 for acting as an impedance matching circuit, and is set to be short so that radiation of the unwanted transverse-wave component $E_\theta$ due to the current flowing through the serial inductor 12.

On the other hand, it can be found from Equation (2) that the longitudinal-wave component $E_R$ is maximum with an angle $\theta$ formed relative to the direction of the microdipole being 0. Therefore, for non-contact communication efficiently using the longitudinal-wave component $E_R$ of the electric field, it is preferable to transmit a high-frequency electric-field signal by disposing the high-frequency coupler on the receiver so as to face with the angle $\theta$ formed relative to the direction of the microdipole being 0.

Also, with the resonating unit formed of the serial inductor 12 and the parallel inductor 13, the current of the high-frequency signal flowing into the coupling electrode 14 by the resonating unit can be further increased. As a result, the moment of the microdipole formed of the charges stored in the coupling electrode 14 and the mirror-image charges on a ground side can be increased. With this, a high-frequency electric-field signal formed of the longitudinal-wave component $E_R$ can be efficiently emitted toward a propagation direction with the angle $\theta$ formed relative to the direction of the microdipole being 0.

In the high-frequency coupler depicted in FIG. 2, an impedance matching unit has an operation frequency $f_o$ determined by constants $L_1$ and $L_2$ of the parallel inductor and the serial inductor. However, in related art, a lumped constant circuit has a band narrower than that of a distributed constant circuit in a high-frequency circuit. Also, since the constant of the inductor is small with a high frequency, the resonant frequency is disadvantageously shifted due to variations in constant. To get around this, a high-frequency coupler is formed by replacing the lumped constant circuit in the impedance matching unit and the resonating unit with a distributed constant circuit, thereby allowing a wide band.

Figure 7:
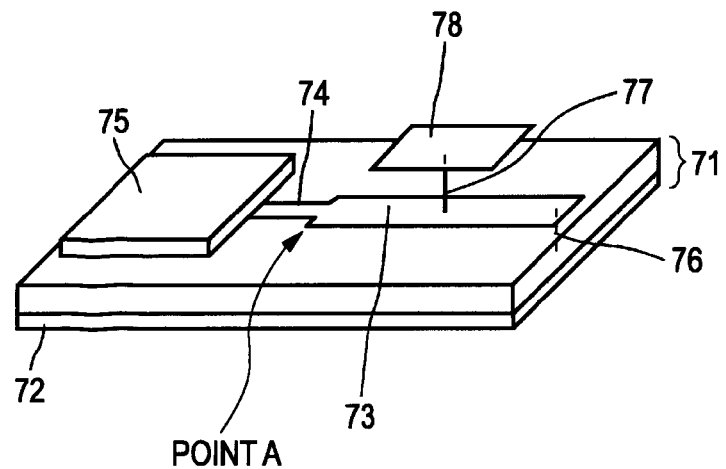
FIG. 7 illustrates an example of the structure of a high-frequency coupler using a distributed constant circuit as an impedance matching unit and a resonating unit.

FIG. 7 illustrates an example of the structure of a high-frequency coupler using a distributed constant circuit as an impedance matching unit and a resonating unit. In the example of FIG. 7, a ground conductor 72 is formed on a lower surface. Also, the high-frequency coupler is disposed on a printed board 71 having an upper surface on which a printed pattern is formed. As the impedance matching unit and the resonating unit of the high-frequency coupler, a microstrip line or coplanar waveguide, that is, a stub 73, is formed acting as a distributed constant circuit in place of the parallel inductor and the serial inductor, and is connected to a transmission and reception circuit module 75 via a pattern of a signal line 74. A tip of the stub 73 is connected to the ground 72 on a lower surface via a through hole 76 penetrating through the printed board 71 for short-circuit. Also, a portion near the center of the stub 73 is connected to a coupling electrode 78 via one terminal 77 made of a thin metal line.

Here, a stub in the technical field of electronics is a generic name for a wire with one end connected and the other end unconnected or grounded, and is provided at some point in a circuit for adjustment, measurement, impedance matching, filtering, or other purposes.

Figure 8:
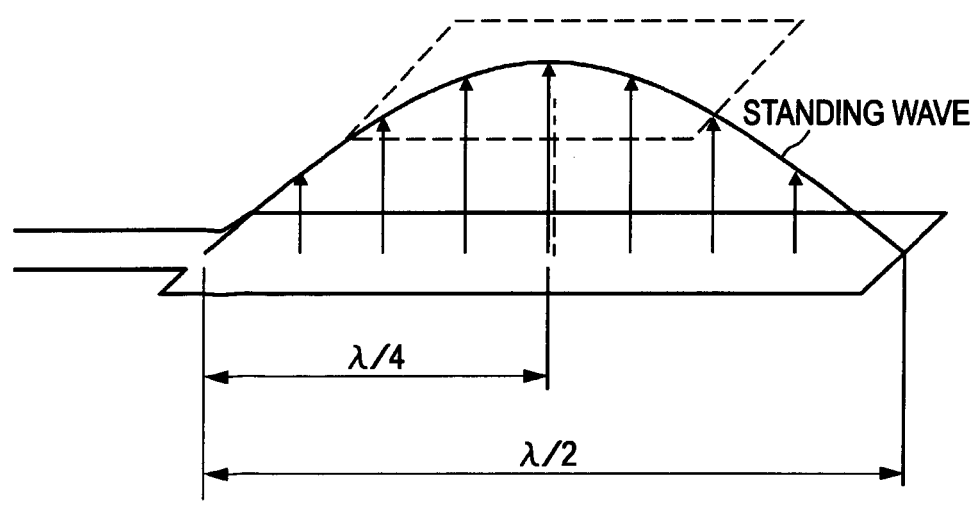
FIG. 8 illustrates the state in which a standing wave occurs on a stub.

Here, a signal input from the transmission and reception circuit via the signal line is reflected at the tip of the stub 73, thereby causing a standing wave in the stub 73. The phase length of the stub 73 is set to be an approximately ½ wavelength of the high-frequency signal (180 degrees of a phase), and the signal line 74 and the stub 73 are formed of a microstrip line, coplanar line, or the like on the printed board 71. As depicted in FIG. 8, when the tip of the stub 73 is short-circuited with a phase length of a ½ wavelength, the voltage amplitude of the standing wave occurring in the stub 73 is 0 at the tip of the stub 73 and is maximum at the center of the stub 73, that is, at a position of a ¼ wavelength (90 degrees) from the tip of the stub 73. With the coupling electrode 78 connected via one terminal 77 to the center of the stub 73 where the voltage amplitude of the standing wave is maximum, a high-frequency coupler with excellent propagation efficiency can be made.

In FIG. 7, the stub 73 is a microstrip line or coplanar waveguide on the printed board 71, and has a small direct-current resistance. Therefore, the loss is small even with a high-frequency signal, and propagation loss between high-frequency couplers can be decreased. Also, the size of the stub 73 forming a distributed constant circuit is large to the extent of an approximately ½ wavelength of the high-frequency signal. Therefore, an error in dimension due to tolerances in fabrication is subtle compared with the entire phase length, thereby hardly producing variations in characteristics.

The high-frequency coupler depicted in FIG. 7 is configured to have the coupling electrode supported at an approximately center by one terminal made of a metal line, and therefore has an insufficient mechanical strength. For example, as depicted in FIG. 3, in one designing method, a pattern serving as a coupling electrode can be vapor-deposited on an upper end face of a spacer made of a dielectric, and a conductor with which a through hole penetrating through a spacer is filled can be used in place of a serial inductor. However, by disposing the spacer, component cost and the weight of the device may be disadvantageously increased.

In another method, the coupling electrode can be fabricated through sheet metal working. With a plurality of terminals supporting the coupling electrode on the resonant stub, a sufficient mechanical strength can be ensured without a spacer. Also, the high-frequency coupler can be fabricated in a simple manner at low cost. This is suitable for mass production.

FIGS. 9A to 9C and 10A to 10O illustrate a method of fabricating a coupling electrode supported by a plurality of terminals by using sheet metal working. Here, for sheet metal working, a surface-plated phosphorus bronze plate can be used, for example.

A sheet metal made of copper or the like is first stamped to form an upper-surface flat portion and a terminal. The upper-surface flat portion has a relatively wide surface area, and acts as the coupling electrode 14 for storing charges. Also, the terminal serves as a supporting part supporting the upper-surface flat portion on the board, and acts as a propagation path for charges to the coupling electrode 14 and also as the serial inductor 12.

Next, the terminal is bent so as to be approximately perpendicular to the upper-surface flat portion, and a lower end of the terminal is further bent to form a foot flat portion also serving as a connecting portion with the high-frequency signal line and also set a desired height of the terminal. The desired height herein corresponds to a dimension allowing a role of avoiding coupling between the coupling electrode 14 and the ground 18 without operating as a capacitance-loaded antenna and also a role of forming the serial inductor 12 with this terminal.

With thus completed coupling electrode being fixed to, for example, a relevant place on the printed board with a jig (not shown) or the like, the foot flat portion as a connecting portion can be mounted on the wiring pattern on the board through reflow soldering.

Figure 11:
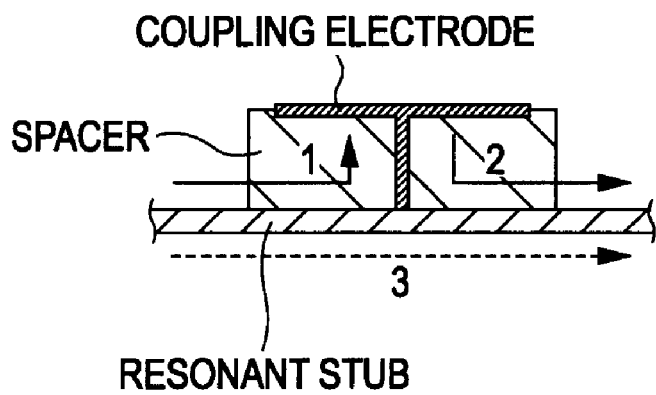
FIG. 11 illustrates the sectional structure of a high-frequency coupler with a coupling electrode supported by a spacer made of a dielectric, the coupling electrode being connected to a resonant stub with one metal line penetrating through a through hole of the spacer.
Figure 12:
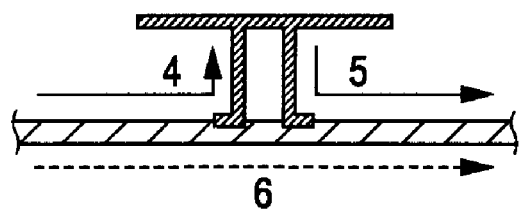
FIG. 12 illustrates the sectional structure of a high-frequency coupler with a coupling electrode supported by two terminals on a resonant stub.

Here, a difference in electrical characteristics is studied below between the case of using one terminal for connecting the coupling electrode to the resonant stub and the case of using two terminals for supporting the coupling electrode. FIG. 11 illustrates the sectional structure of a high-frequency coupler with a coupling electrode supported by a spacer made of a dielectric, the coupling electrode being connected to a resonant stub with a terminal made of one metal line penetrating through a through hole of the spacer. FIG. 12 illustrates the sectional structure of a high-frequency coupler with a coupling electrode supported by two terminals on a resonant stub.

A current input from the transmission and reception circuit unit via the signal line flows toward the ground via the resonant stub and the through hole at its tip. Here, when more currents flows into a coupling electrode side via the terminal, the transmission signal strength of the high-frequency coupler can be increased. As depicted in FIG. 8, when the tip of the stub having a phase length of a ½ wavelength is short-circuited to the ground, the voltage amplitude of the standing wave occurring in the sub is maximum at the center of the stub, that is, at a ¼ wavelength (90 degrees) from the tip. Therefore, the coupling electrode is preferably connected to the center of the stub with a terminal (as described above).

However, as a result of an experiment, it was found that a current flowing into the coupling electrode from the resonant stub via two terminals (indicated by arrows 4 and 5) in FIG. 12 is smaller than a current flowing into the coupling electrode from the resonant stub via one terminal (indicated by arrows 1 and 2) in FIG. 11. This is because, with two terminals for connecting the coupling electrode to the resonant stub, the current passing over the resonant stub without flowing into the coupling electrode (indicated by an arrow 6 in FIG. 12) is increased more than a current passing over the resonant stub in the case of one terminal (indicated by an arrow 3 in FIG. 11). As a result, the current is difficult to flow to a coupling electrode side, thereby causing deterioration in efficiency of the high-frequency coupler.

Figure 13:
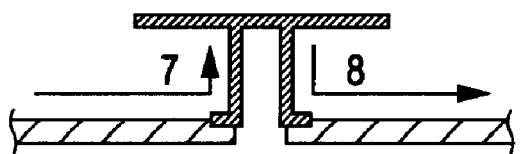
FIG. 13 illustrates the sectional structure of a high-frequency coupler in which a resonant stub is cut out and front and rear terminals supporting a coupling electrode are connected to the resonant stub so as to overstride the cut-out portion.

Thus, to suppress a current passing over the resonant stub without flowing into the coupling electrode, Japanese Unexamined Patent Application Publication No. 2008-312074 already assigned to Sony Corporation suggests, as depicted in FIG. 13, a high-frequency coupler in which a resonant stub is cut out, and two terminals, front and rear, supporting the coupling electrode are connected to the resonant stub so as to overstride the cut-out portion. A tip of the cut-out resonant stub is referred to below as a first resonant stub, and the other input end of the signal line is referred to below as a second resonant stub.

According to the structure depicted in FIG. 13, to cause a current input from the transmission and reception circuit unit via the signal line to flow toward the tip of the resonant stub, the current once flows to the coupling electrode via a terminal as indicated by an arrow 7 in FIG. 13, and then flows into the resonant stub after the cut-out portion via another terminal as indicated by an arrow 8 in FIG. 13. That is, an extremely small amount of current components passes over the coupling electrode to flow through the resonant stub, as indicated by the arrow 6 in FIG. 12. Therefore, if the current amount indicated by the arrows 7 and 8 in FIG. 13 is increased, the characteristics of the high-frequency coupler may be improved.

Next, the mounting position of the coupling electrodes or the cut-out position of the resonant stub is studied below.

Even in a high-frequency coupler configured so that the resonant stub as depicted in FIG. 13 is cut out and two terminals, front and rear, supporting the coupling electrode are connected to the resonant stub so as to overstride the cut-out portion, as with the example of the structure depicted in FIG. 7, the coupling electrode is preferably disposed near a position with a large amplitude of the voltage standing wave.

Figure 14:
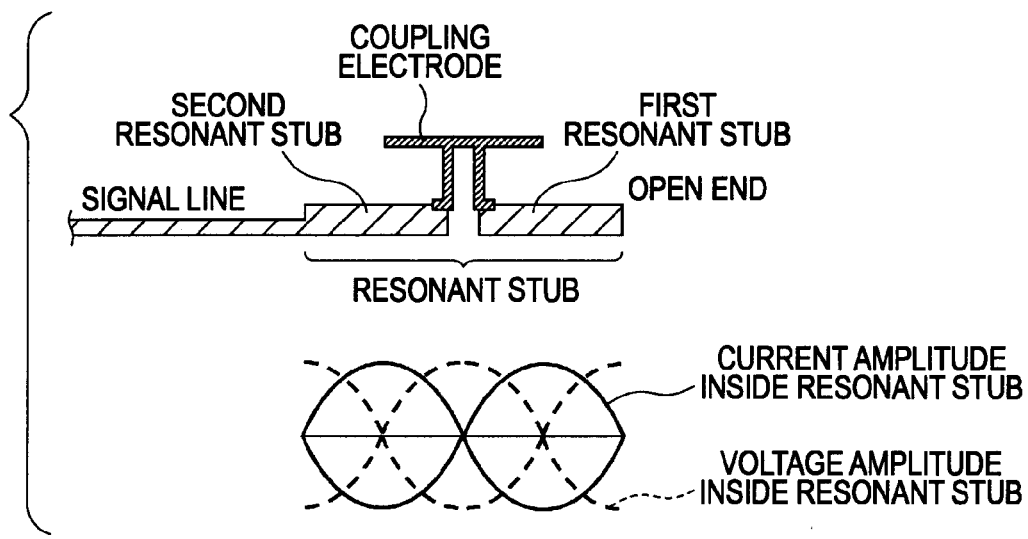
FIG. 14 illustrates amplitudes of a voltage standing wave and a current standing wave when a first resonant stub is an open end.

FIG. 14 illustrates amplitudes of a voltage standing wave and a current standing wave inside the resonant stub when the first resonant stub is an open end. In this case, as depicted in FIG. 14, a voltage standing wave that is maximum at the open end on a first resonant stub and an input end on a second resonant stub occurs, and a current standing wave has a phase difference by $\pi/4$ with respect to the voltage standing wave. Therefore, when the entire length (phase length) of the resonant stub, the terminals, and the coupling electrode is set approximately equal to the phase length of a resonant frequency at 360 degrees, that is, approximately one wavelength as depicted in FIG. 14, the amplitude of the voltage standing wave is large at its approximately center. Therefore, it is preferable to cut out the resonant stub into first and second resonant stubs at an approximately center and mount the coupling electrode so that this cut-out portion is connected with two terminals.

When the coupling electrode is supported by one terminal, an unwanted radio wave may disadvantageously occur due to a current flowing through this terminal (refer to FIG. 6). By contrast, when the coupling electrode is supported by two terminals, the coupling electrode is placed at a position where currents in opposite directions flow through the respective terminals. With this, these currents are canceled out each other to reduce radiation of an unwanted radio wave.

Next, lowering the height of the high-frequency coupler is studied below.

Figure 15:
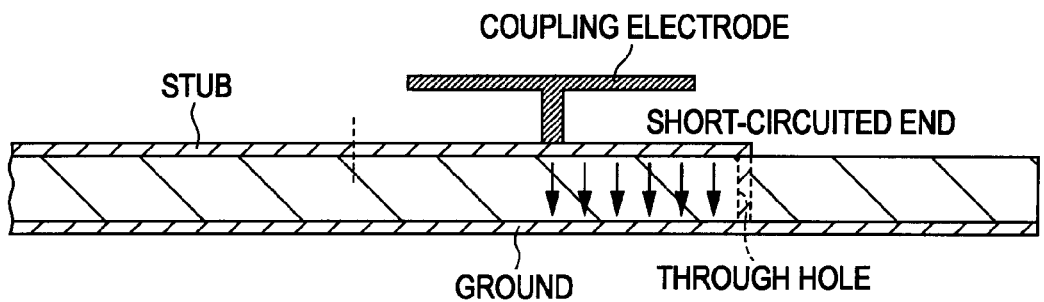
FIG. 15 illustrates an operation characteristic of a stub with its tip as a short-circuited end.

In the structure where the coupling electrode is supported by one terminal as depicted in FIG. 7, the tip of the stub as a resonating unit is short-circuited to the ground. With this, an electric field between the stub on the printed board and the ground can be maintained strong (refer to FIG. 15). As a result, even the height from the ground to the coupling electrode is lowered, electrical coupling between the coupling electrode and the stub can be suppressed, thereby lowering the height of the high-frequency coupler. According to an experiment performed by the inventor, it was confirmed that the height can be lowered up to 1.5 mm, as compared with 3 mm in the past. However, the structure of supporting the coupling electrode by only one terminal does not have a sufficient mechanical strength. Moreover, if the structure is changed to support the coupling electrode via a spacer as depicted in FIG. 11, component cost is increased, which is not suitable for mass production.

By contrast, when the structure is fabricated by using sheet metal working to support the coupling electrode by two terminals, as described above, a sufficient mechanical strength can be ensured, and this is also suitable for mass production. Furthermore, as depicted in FIG. 14, when the tip of the resonant stub is an open end, as described above, the phase length of the entire resonant stub and coupling electrode can be set at approximately one wavelength, and a signal can be efficiently fed to the coupling electrode mounted on an approximately center of the high-frequency coupler. For example, one terminal of the coupling electrode having a phase length of a ¼ wavelength is connected to the second stub having a phase length of a ⅜ wavelength, and the other terminal of the coupling electrode is connected to the first stub having a phase length of a ⅜ wavelength.

However, it was found from an experiment by the inventor that, when the tip of the resonant stub is an open end and the height from the ground to the coupling electrode is lowered, deterioration in electrical characteristics occurs, such as a narrowed band. The reason for this can be assumed such that an electrical coupling action occurs between the coupling electrode and the stub due to lowering of the height, thereby impairing the original operations accordingly.

Figure 16A:
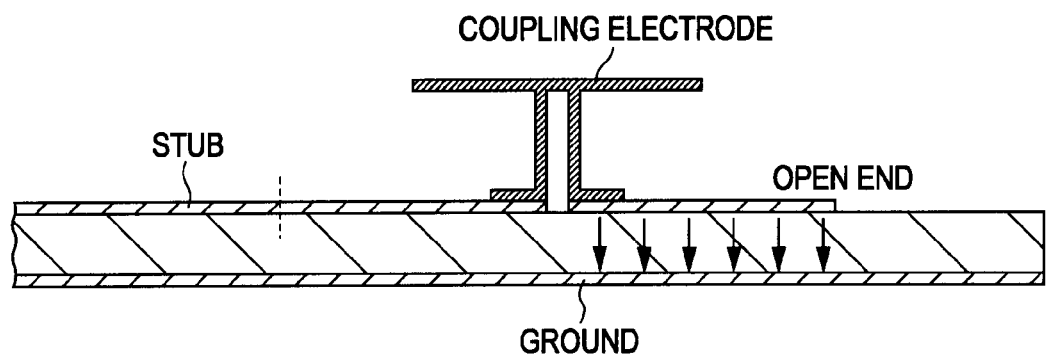
FIG. 16A illustrates an operation characteristic of a stub with its tip as an open end.
Figure 16B:
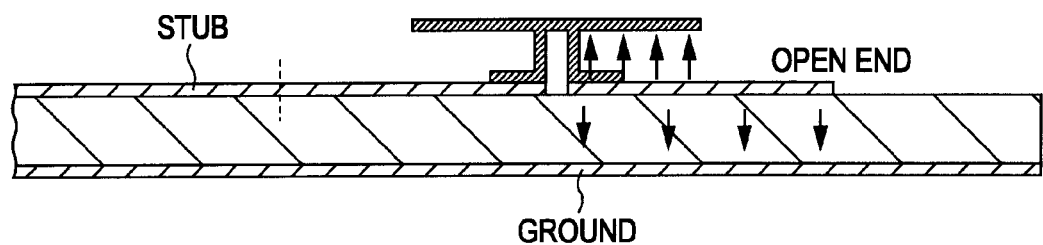
FIG. 16B illustrates an operation characteristic of a stub with its tip as an open end.

The stub is originally formed of a microstrip line on the printed board, and its properties are established by the pattern on the printed board and the ground on the back. As depicted in FIG. 16A, when the height of the coupling electrode is high, the electric field of the stub is concentrated between the pattern on the board and the ground to exert the original performance. However, as depicted in FIG. 16B, when the height of the coupling electrode is lowered to be near the stub, the coupling electrode and the stub are electrically coupled together, thereby impairing a resonant operation as an original stub.

That is, when the tip of the stub is a short-circuited end, the potential can be forcefully fixed at 0V. However, when the tip of the stub is an open end, the potential tends to be indefinite. In particular, when another coupling electrode is present nearby, coupling to that coupling electrode may occur to cause an electrically unstable state.

Thus, the inventor suggests a high-frequency coupler having a new structure of a resonating unit and allowing a desired electrical characteristic to be obtained even with low height while inheriting a coupling electrode that can be mass-produced through sheet metal working.

Figure 9A:
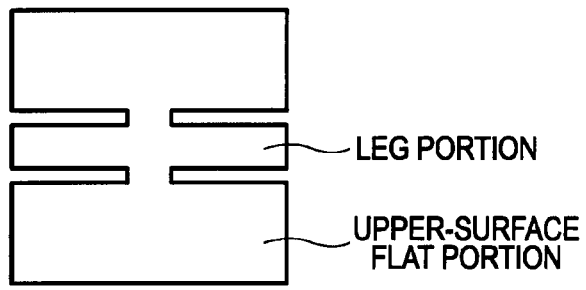
FIG. 9A illustrates an example of a method of fabricating a portion of the coupling electrode of the high-frequency coupler through sheet metal working (after stamping)
Figure 9B:
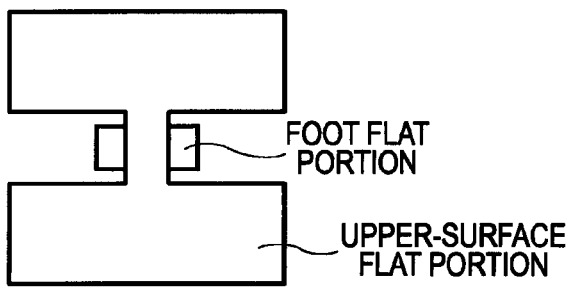
FIG. 9B illustrates an example of the method of fabricating a portion of the coupling electrode of the high-frequency coupler through sheet metal working (after bending)
Figure 9C:
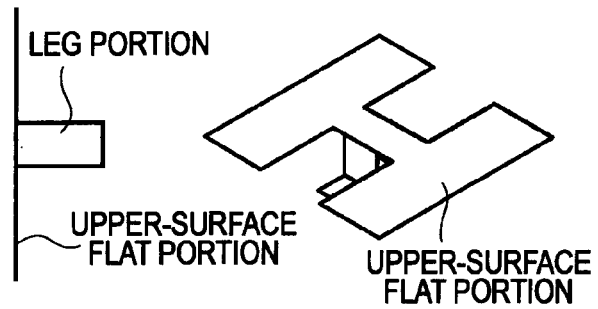
FIG. 9C illustrates an example of the coupling electrode fabricated through sheet metal working (side views and perspective view)
Figure 10A:
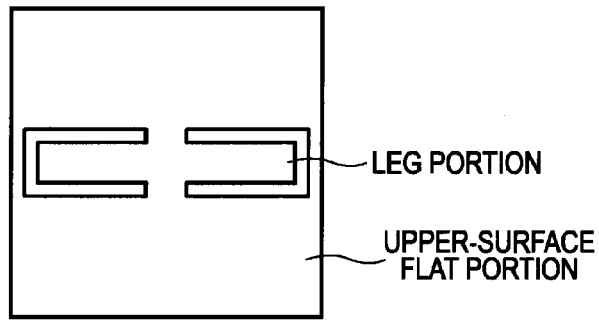
FIG. 10A illustrates an example of the method of fabricating a portion of the coupling electrode of the high-frequency coupler through sheet metal working (after stamping)
Figure 10B:
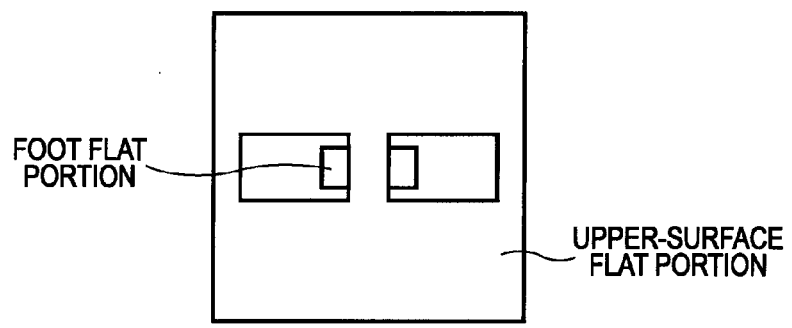
FIG. 10B illustrates an example of the method of fabricating a portion of the coupling electrode of the high-frequency coupler through sheet metal working (after bending)
Figure 10C:
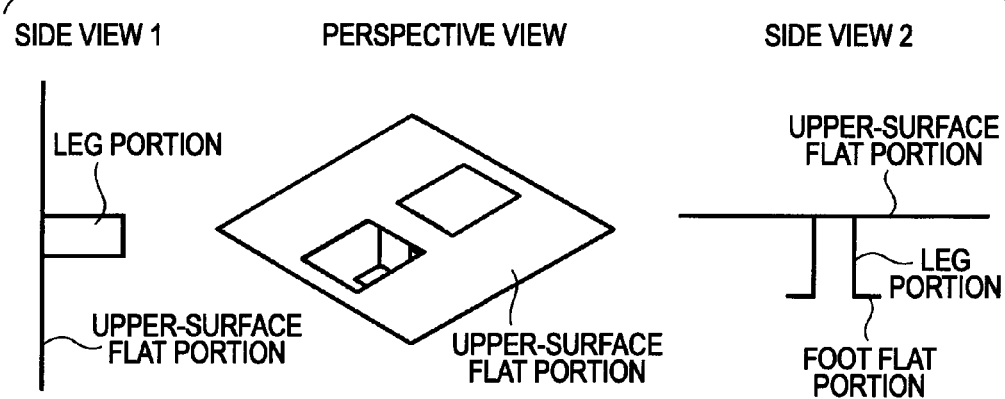
FIG. 10C illustrates an example of the coupling electrode fabricated through sheet metal working (side views and perspective view)
Figure 17A:
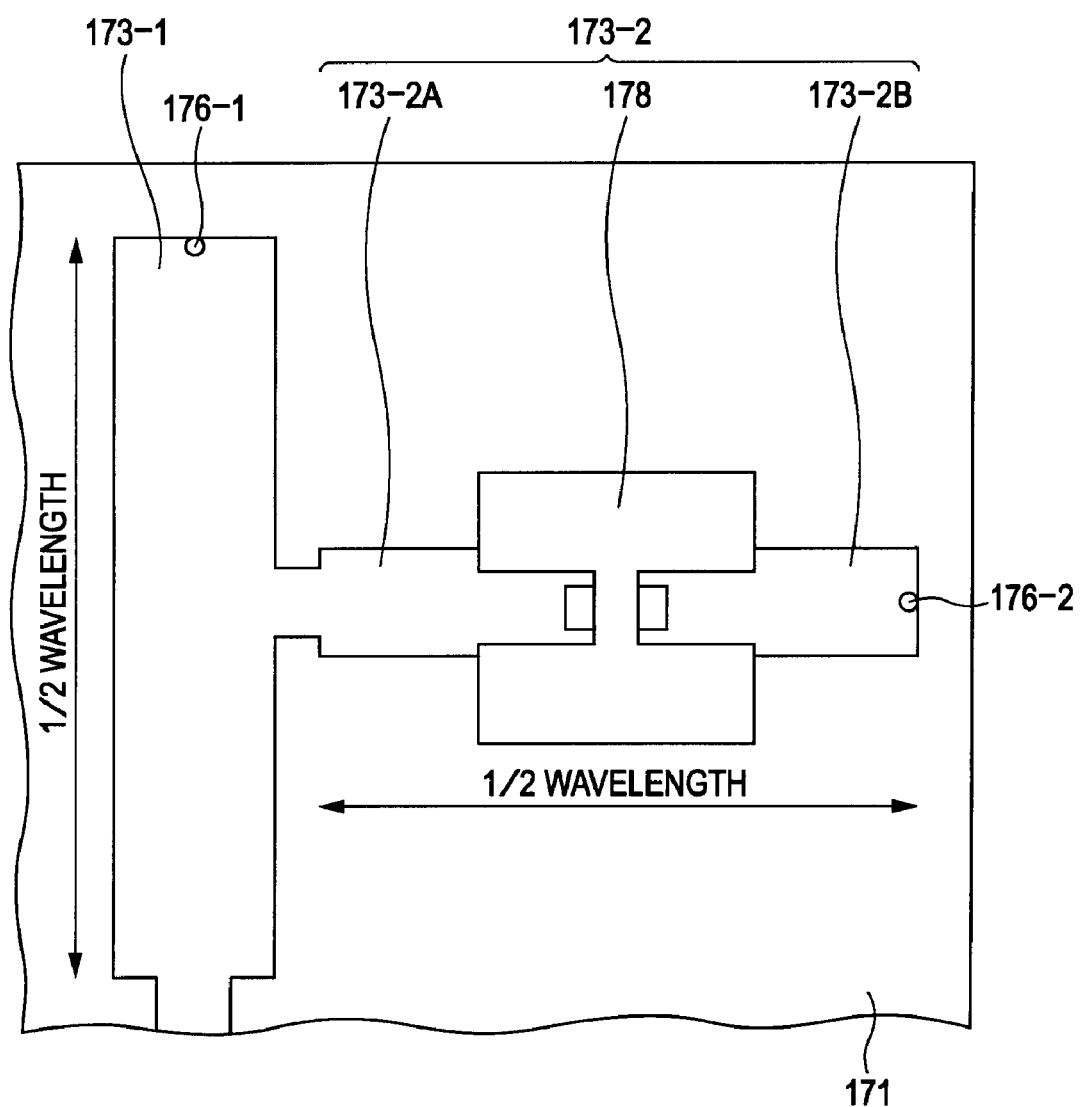
FIG. 17A illustrates (a top view of) a high-frequency coupler configured so that a coupling electrode fabricated through sheet metal working is implemented on a printed board.
Figure 17B:
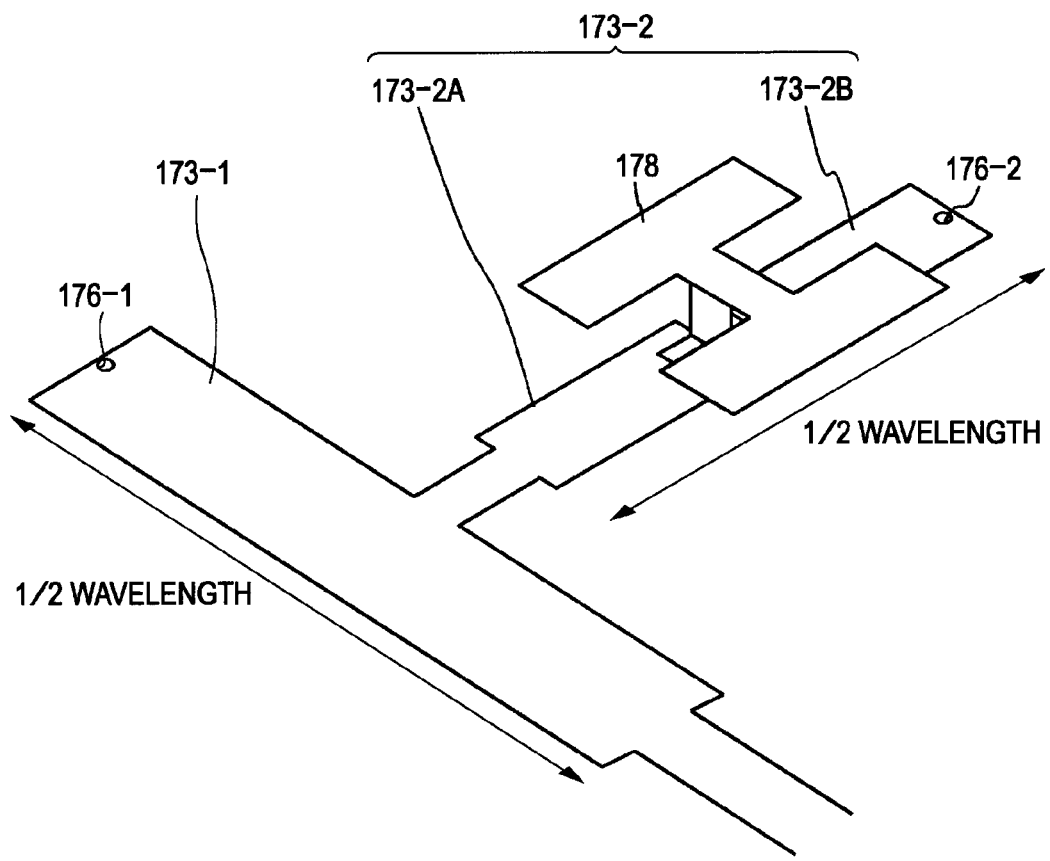
FIG. 17B illustrates (a perspective view of) the high-frequency coupler configured so that the coupling electrode fabricated through sheet metal working is implemented on the printed board.
Figure 17C:
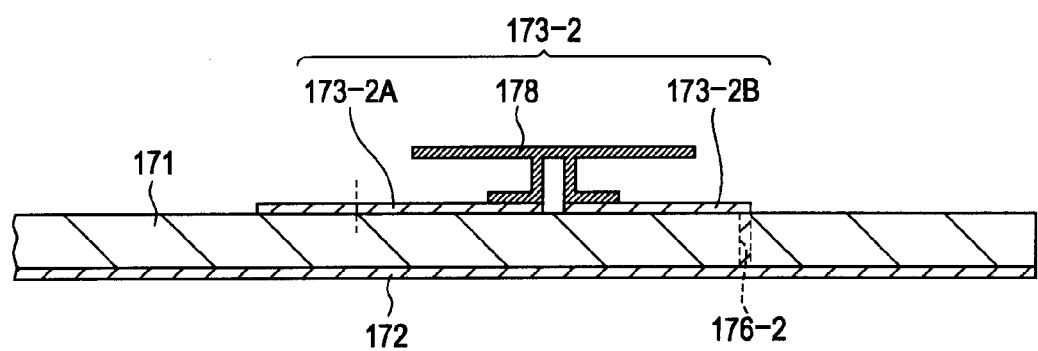
FIG. 17C illustrates (a sectional view of) the high-frequency coupler configured so that the coupling electrode fabricated through sheet metal working is implemented on the printed board.

FIGS. 17A, 17B, and 17C are a top view, a perspective view, and a sectional view, respectively, of a high-frequency coupler configured so that a coupling electrode fabricated through sheet metal working is mounted on a resonant stub formed as a microstrip line or coplanar waveguide on a printed board. Here, in the example depicted in FIGS. 17A to 17C, the coupling electrode depicted in FIGS. 9A to 9C is used. Alternatively, as a matter of course, the coupling electrode depicted in FIGS. 10A to 10C and other structures in which a coupling electrode is supported by two terminals fabricated through sheet metal working can be similarly used.

In FIGS. 17A to 17C, a high-frequency coupler is disposed on a printed board 171 having a ground conductor 172 formed on a lower surface and a printed pattern formed on an upper surface. As an impedance matching unit and resonating unit of the high-frequency coupler, a microstrip line or a coplanar waveguide acting as a distributed constant circuit, that is, a stub, is formed, which is connected to a transmission and reception circuit module (not shown) via a signal line pattern.

The resonating unit in the high-frequency coupler depicted in FIGS. 17A to 17C is formed of a stub, and has two stages, that is, a first resonating unit 173-1 at a front stage and a second resonating unit 173-2 at a rear stage. The first resonating unit 173-1 is connected at its tip to a ground 172 on a lower surface via a through hole 176-1 penetrating through the printed board 171 for short circuit, and is a short-circuited end. Also, a side of the first resonating unit 173-1 not short-circuited to the ground 172 is connected to the transmission and reception circuit module (not shown) via a microstrip line or the like. The second resonating unit 173-2 is connected to an approximately center of the first resonating unit 173-1.

A stub forming the second resonating unit 173-2 is cut out into two, that is, a first stub 173-2A and a second stub 173-2B. Two terminals, front and rear, supporting a coupling electrode 178 are connected to the first stub 173-2A and the second stub 173-2B so as to overstride this cut-out portion. The first stub 173-2A, a part of the coupling electrode 178, and the second stub 173-2B operate as one resonating unit. The second stub 173-2B is connected at its tip to the ground 172 on a lower surface via a through hole 176-2 penetrating through the printed board 171 for short circuit, and is a short-circuited end of the second resonating unit 173-2.

Here, although no transmission and reception circuit unit is depicted in any of FIGS. 17A to 17C, the transmission and reception circuit unit may be provided on the same board, or may be configured on another board via a high-frequency connector or coaxial cable so as to be separately placed at an optimum position of a wireless device.

Similarly as described above, it is preferable to dispose the coupling electrode 178 near a position where the amplitude of the voltage standing wave is large. A method of configuring a high-frequency coupler in consideration of a voltage standing wave is described below.

Figure 18:
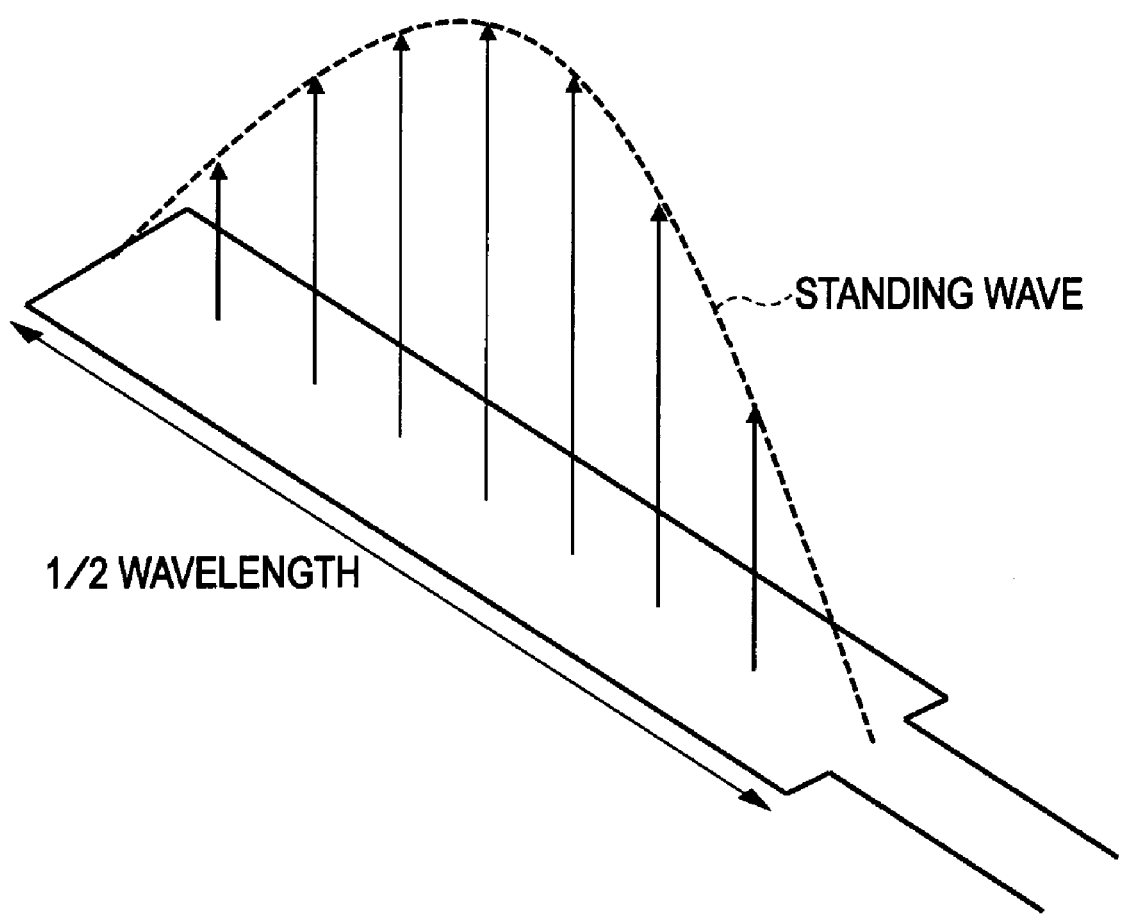
FIG. 18 illustrates the state in which a standing wave occurs in a first resonating unit of the high-frequency coupler depicted in FIGS. 17A to 17C.

The first resonating unit 173-1 at the front stage is a stub having a phase length of a ½ wavelength, and its tip is a short-circuited tip. Therefore, as depicted in FIG. 18, the voltage amplitude of the standing wave occurring the first resonating unit 173-1 is 0 at its tip, and is maximum near a center, that is, a ¼ wavelength (90 degrees). Then, with the second resonating unit 173-2 connected near the center where the voltage standing wave is approximately maximum, a high-frequency signal can be more efficiently fed from the first resonating unit 173-1 to the second resonating unit 173-2.

The second resonating unit 173-2 at the rear stage includes the first stub 173-2A and the second stub 173-2B obtained by division into two, and the coupling electrode 178 connected between these stubs. The phase length of the entire second resonating unit 173-2 is set as an approximately ½ wavelength, and its tip is short-circuited to the ground 172 via the through hole 176-2.

Here, the coupling electrode 178 is connected so as to be positioned at the exact center of the second resonating unit 173-2, the tip of the second stub 173-2B is connected to the ground 172 with a voltage amplitude becoming a node of 0, but the voltage amplitude is maximized at the position of the coupling electrode 178.

The second resonating unit 173-2 has a phase length of a ½ wavelength with its tip short-circuited, and is connected to the center of the first resonating unit 173-1. A side of the first resonating unit not short-circuited to the ground is connected to the transmission and reception circuit via a microstrip line or the like.

With the structure as depicted in FIGS. 17A to 17C, a high-frequency coupler resonating at a desired frequency can be fabricated. When the phase length of the first stub 173-2A and the phase length of the second stub 173-2B are set equal to each other, the voltage amplitude of the standing wave is maximized at the position of the coupling electrode. Therefore, a high-frequency coupler capable of stronger coupling can be obtained. Furthermore, to further increase sensitivity of the high-frequency coupler, a phase length of a ½ wavelength can be allocated so that the phase length of the first stub 173-2A and the phase length of the second stub 173-2B are each set at a ⅛ wavelength and the phase length from one terminal of the coupling electrode 178 to the other terminal is set at a ¼ wavelength.

Figure 19:
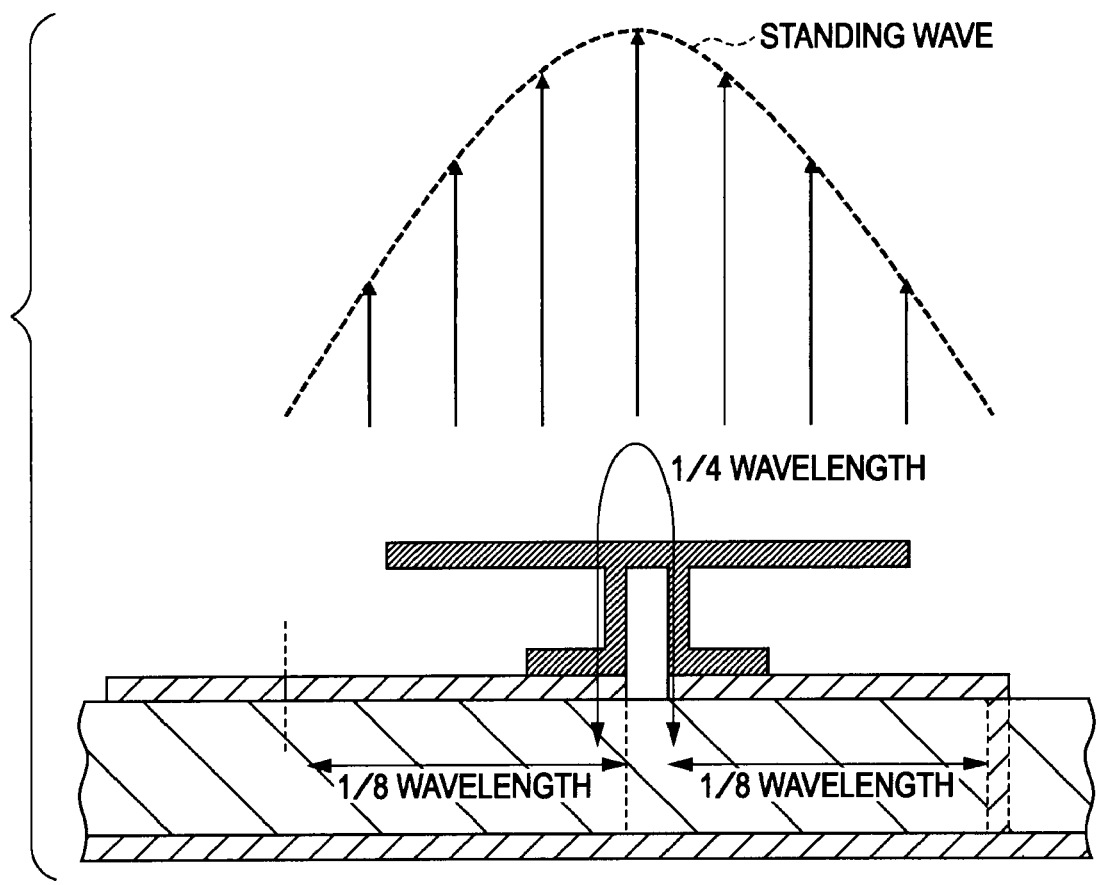
FIG. 19 illustrates the state in which a standing wave occurs in a second resonating unit in the high-frequency coupler depicted in FIGS. 17A to 17C when phase-length allocation is such that the phase length of first and second stubs is a ⅛ wavelength and the phase length from one terminal to the other terminal of the coupling electrode is a ¼ wavelength.

FIG. 19 illustrates the state in which a standing wave occurs in the second resonating unit 173-2 when phase-length allocation is as described above. It can be understood from FIG. 19 that the position of the coupling electrode 178 matches the position at which the voltage amplitude of the standing wave is maximized and therefore a high-frequency coupler capable of stronger coupling can be obtained.

Also, when a circuit corresponding to the impedance characteristics of the stub is fabricated of a lumped-constant chip inductor and chip capacitor, the resonating units 173-1 and 173-2 can further be small-sized.

The coupling electrode 178 for use in the high-frequency coupler depicted in FIGS. 17A to 17C can be implemented at low cost by stamping and bending one sheet metal.

The present application contains subject matter related to that disclosed in Japanese Priority Patent Application JP 2009-080793 filed in the Japan Patent Office on Mar. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
   a communication circuit unit processing a high-frequency signal transmitting data;
   a transmission path for the high-frequency signal, the transmission path being connected to the communication circuit unit;
   a ground;
   a coupling electrode supported by two terminals so as to face the ground and to be separated by a height negligible with respect to a wavelength of the high-frequency signal; and
   a resonating unit increasing a current flowing into the coupling electrode via the transmission path; wherein
   the resonating unit includes a first resonating unit connected to the transmission path, the first resonating unit comprising a stub having a phase length of an approximately ½ wavelength, and being short-circuited to the ground at another end not connected to the transmission path, and a second resonating unit having one end connected to an approximately center position of the first resonating unit and another end short-circuited to the ground, the second resonating unit having the terminals of the coupling electrode connected thereto, and
   a microdipole is formed of a line segment connecting a center of charges stored in the coupling electrode and a center of mirror-image charges stored in the ground, and the high-frequency signal is transmitted to a distant side disposed so as to face the communication device with an angle A formed relative to a direction of the microdipole being approximately 0 degree.

2. The communication device according to claim 1, wherein:
   the ground is a conductor pattern formed on one surface of a dielectric board; and
   the first resonating unit and the second resonating unit are stubs each formed of a conductor pattern formed on another surface of the dielectric board.

3. The communication device according to claim 1, wherein:
   the second resonating unit is divided at a cut-out portion at a predetermined position, and is formed of a first stub having one end connected to the first resonating unit and a second stub having a tip short-circuited to the ground; and
   one of the terminals of the coupling electrode is connected to the first stub and another of the terminals is connected to the second stub.

4. The communication device according to claim 3, wherein the first stub and the second stub have an approximately same phase length.

5. The communication device according to claim 3, wherein the second resonating unit including the first stub, the coupling electrode, and the second stub has, as a whole, a phase length of an approximately ½ wavelength.

6. The communication device according to claim 5, wherein the first and second stubs both have a phase length of an approximately ⅛ wavelength, and the coupling electrode connected to the first and second stubs with the two terminals has a phase length of an approximately ¼ wavelength.

7. The communication device according to claim 1, wherein the high-frequency signal is a UWB signal using an ultra wide band.

8. A high-frequency coupler comprising:
a transmission path for a high-frequency signal;
a ground;
a coupling electrode supported by two terminals so as to face the ground and to be separated by a height negligible with respect to a wavelength of the high-frequency signal; and
a resonating unit increasing a current flowing into the coupling electrode via the transmission path; wherein
the resonating unit includes a first resonating unit connected to the transmission path, the first resonating unit comprising a stub having a phase length of an approximately ½ wavelength, and being short-circuited to the ground at another end not connected to the transmission path, and a second resonating unit having one end connected to an approximately center position of the first resonating unit and another end short-circuited to the ground, the second resonating unit having the terminals of the coupling electrode connected thereto, and
a microdipole is formed of a line segment connecting a center of charges stored in the coupling electrode and a center of mirror-image charges stored in the ground, and the high-frequency signal is transmitted to a high-frequency coupler, of a distant side, disposed so as to face the high-frequency coupler with an angle .theta. formed relative to a direction of the microdipole being approximately 0 degree.

* * * * *